(No Model.)

C. S. MARTIN.
MEANS FOR SETTING TIRES.

No. 568,363. Patented Sept. 29, 1896.

Witnesses:
Alice M. Sovereign
E. Behel.

Inventor:
Cyrus S. Martin
By A. O. Behel
Attys.

THE NORRIS PETERS CO., PHOTO-LITHO., WASHINGTON, D. C.

UNITED STATES PATENT OFFICE.

CYRUS S. MARTIN, OF ROCKFORD, ILLINOIS.

MEANS FOR SETTING TIRES.

SPECIFICATION forming part of Letters Patent No. 568,363, dated September 29, 1896.

Application filed September 23, 1895. Serial No. 563,413. (No model.)

*To all whom it may concern:*

Be it known that I, CYRUS S. MARTIN, a citizen of the United States, residing at Rockford, in the county of Winnebago and State of Illinois, have invented certain new and useful Improvements in Means for Setting Tires, of which the following is a specification.

The object of this invention is to set a vehicle-tire by cutting the tire and connecting the ends with a key.

Figure 1:
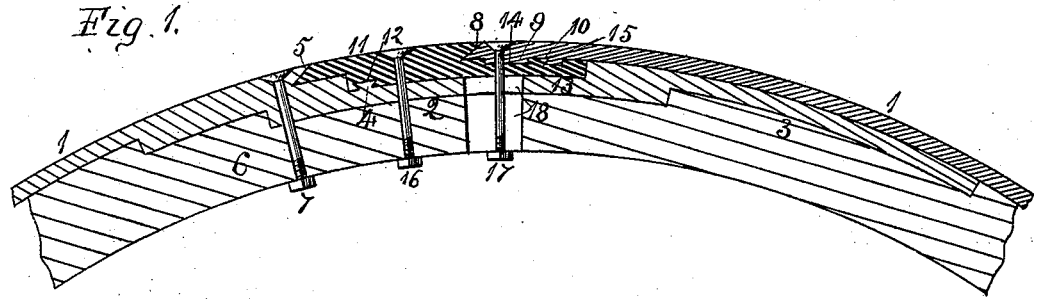
Figure 2:
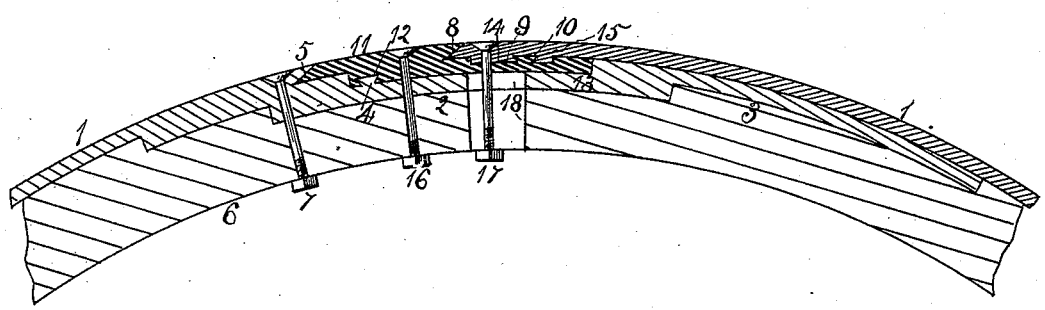
Figure 3:
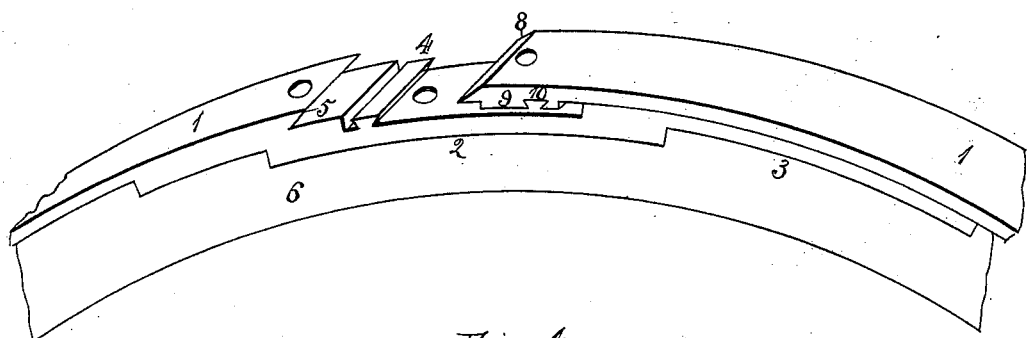
Figure 4:
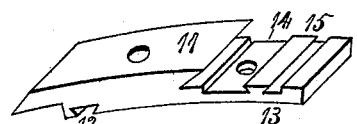

In the accompanying drawings, Figure 1 is a section of a portion of a wheel and my improved means for setting the tire. Fig. 2 is a view similar to Fig. 1, in which the tire has been drawn up. Fig. 3 is an isometrical representation of the tire and a portion of a felly, the key being removed. Fig. 4 is an isometrical representation of the key.

The tire 1 is cut in two, and one end provided with an irregular extension composed of the center depressed portion 2 and wing 3. The center portion has a tongue 4, extending transverse to its length, and the end of the tire has an undercut 5. The felly 6 has its outer face recessed to receive the wing and center depressed portion. A bolt 7 passes through the end of the tire and felly, clamping the parts together. The outer end 8 of the tire is beveled, and its under face has an enlargement 9, which has a transverse groove 10.

A key (shown at Fig. 4) has its outer face 11 of the same curvature as the outer face of the tire having its ends beveled and its under face provided with a transverse groove 12. This key has an extension 13, the upper face of which has a recess 14, having a transverse projection 15.

The tire is placed around the felly, and the end fitted in the cut-away portion of the felly is seated therein and held by the bolt 7. The other end of the tire is drawn toward the secured end by any suitable means until the required strain is exerted. A key is driven into place, as shown at Fig. 1, the irregularities of the key fitting the irregularities of the tire. A bolt 16 is passed through the key, depressed portion 2 and felly 6, firmly clamping the parts together, and a bolt 17 is passed through the tire, key, depressed portion, and felly, holding these parts together.

Different keys are employed to properly take up the slack in the tire, as shown at Figs. 1 and 2, the openings for the bolt 16 being the same. The depressed portion 2 and felly are provided with an elongated opening 18 to permit a movement of the bolt 17, adjusting the tire. By this arrangement the tire can be quickly tightened without the expense of taking the vehicle to a blacksmith.

I claim as my invention—

In a tire-tightener, the combination of a wheel-felly having a recess in its periphery, a tire located upon the felly one end having an extension integral therewith being located in the recess, the other end overlapping the extension having an enlargement on its under face, a key located in contact with the extension having a detachable connection therewith, and having a portion overlapping one end of the tire and engaging the enlargement, the other end of the tire overlapping a portion of the key, a bolt passing through the enlarged end of the tire, key, extension and felly, and a bolt passing through the key between the ends of the tire, extension and felly.

CYRUS S. MARTIN.

Witnesses:
W. A. WAYLAND,
A. O. BEHEL.